(12) United States Patent
Stenhouse

(10) Patent No.: US 9,052,057 B2
(45) Date of Patent: Jun. 9, 2015

(54) FLEXIBLE MOUNT APPARATUS AND SYSTEM

(71) Applicant: MW Products LLC, Phoenix, AZ (US)

(72) Inventor: Brett Stenhouse, Phoenix, AZ (US)

(73) Assignee: MW Products LLC, Phoenix, AZ (US)

( * ) Notice: Subject to any disclaimer, the term of this patent is extended or adjusted under 35 U.S.C. 154(b) by 0 days.

(21) Appl. No.: 13/797,668

(22) Filed: Mar. 12, 2013

(65) Prior Publication Data

US 2014/0091187 A1 Apr. 3, 2014

Related U.S. Application Data

(60) Provisional application No. 61/709,130, filed on Oct. 2, 2012.

(51) Int. Cl.
| | |
|---|---|
| *E04G 3/00* | (2006.01) |
| *F16M 13/02* | (2006.01) |
| *F16M 11/04* | (2006.01) |
| *F16M 11/38* | (2006.01) |

(52) U.S. Cl.
CPC ........... *F16M 13/022* (2013.01); *F16M 11/041* (2013.01); *F16M 11/38* (2013.01); *F16M 13/02* (2013.01)

(58) Field of Classification Search
USPC .............. 248/276.1, 281.11, 284.1, 917, 918, 248/460, 489
See application file for complete search history.

(56) References Cited

U.S. PATENT DOCUMENTS

| | | | |
|---|---|---|---|
| 2,187,870 A * | 1/1940 | Veccia | ............................ 40/610 |
| 5,452,951 A | 9/1995 | Peller | |
| 5,551,658 A | 9/1996 | Dittmer | |
| D405,630 S | 2/1999 | Wohlford | |
| D405,988 S | 2/1999 | Wohlford | |
| D407,244 S | 3/1999 | Wohlford | |
| 6,073,892 A | 6/2000 | Dittmer | |
| D429,581 S | 8/2000 | Wohlford | |
| 6,098,822 A | 8/2000 | Wohlford | |
| D440,079 S | 4/2001 | Wohlford | |
| D446,053 S | 8/2001 | Wohlford | |
| 6,364,128 B1 | 4/2002 | Wohlford | |
| 6,402,109 B1 | 6/2002 | Dittmer | |
| 6,585,214 B1 | 7/2003 | Dittmer | |
| 6,604,722 B1 | 8/2003 | Tan | |
| D493,800 S | 8/2004 | Pfister et al. | |
| D494,596 S | 8/2004 | Pfister | |
| D494,978 S | 8/2004 | Pfister | |

(Continued)

OTHER PUBLICATIONS

Chief, Professional AV Solutions. RXT2 X-Large FIT™ Tilt Wall Mount http://www.chiefmfg.com/Series/RXT; date of download Oct. 20, 2014.

(Continued)

*Primary Examiner* — Amy Sterling
(74) *Attorney, Agent, or Firm* — Lewis Roca Rothgerber LLP

(57) ABSTRACT

A flexible mounting system and apparatus, the system comprising a horizontally collapsible frame and one or more vertical mounting rails coupled to the horizontally collapsible frame. The horizontally collapsible frame is comprised of two horizontal rails, a first side rail pivotally mounted to the two horizontal rails, wherein the first side rail is hinged at the midpoint by a first stationary connector, and a second side rail pivotally mounted to the two horizontal rails, wherein the second side rail is hinged at the midpoint by a second stationary connector.

11 Claims, 4 Drawing Sheets

(56) References Cited

U.S. PATENT DOCUMENTS

| | | |
|---|---|---|
| D495,713 S | 9/2004 | Pfister et al. |
| D495,714 S | 9/2004 | Pfister |
| D496,367 S | 9/2004 | Pfister |
| 6,905,101 B1 | 6/2005 | Dittmer |
| D507,477 S | 7/2005 | Pfister |
| 7,028,961 B1 | 4/2006 | Dittmer et al. |
| 7,077,373 B1 | 7/2006 | Hoebener et al. |
| 7,152,836 B2 | 12/2006 | Pfister et al. |
| 7,156,359 B2 | 1/2007 | Dittmer et al. |
| 7,175,152 B2 | 2/2007 | Dittmer et al. |
| 7,178,775 B2 | 2/2007 | Pfister et al. |
| 7,191,997 B2 | 3/2007 | Bremmon et al. |
| D539,636 S | 4/2007 | Bremmon |
| D540,154 S | 4/2007 | Bremmon |
| D540,332 S | 4/2007 | Dittmer et al. |
| D540,367 S | 4/2007 | Dittmer |
| D546,366 S | 7/2007 | Dittmer |
| 7,243,892 B2 | 7/2007 | Pfister |
| D549,063 S | 8/2007 | Pribyl et al. |
| D549,558 S | 8/2007 | Dittmer et al. |
| D553,483 S | 10/2007 | Grey |
| D556,205 S | 11/2007 | Wohlford et al. |
| D559,657 S | 1/2008 | Wohlford et al. |
| D559,658 S | 1/2008 | Wohlford et al. |
| D559,661 S | 1/2008 | Wohlford et al. |
| D560,674 S | 1/2008 | Wohlford et al. |
| D560,675 S | 1/2008 | Wohlford et al. |
| D560,676 S | 1/2008 | Wohlford et al. |
| D560,677 S | 1/2008 | Wohlford et al. |
| 7,316,379 B1 * | 1/2008 | Graham ............... 248/298.1 |
| 7,317,611 B2 | 1/2008 | Dittmer |
| D561,188 S | 2/2008 | Wohlford et al. |
| D561,189 S | 2/2008 | Wohlford et al. |
| D561,561 S | 2/2008 | Wohlford et al. |
| D561,562 S | 2/2008 | Wohlford et al. |
| D561,569 S | 2/2008 | Wohlford et al. |
| D561,775 S | 2/2008 | Wohlford et al. |
| 7,334,762 B2 | 2/2008 | Dittmer |
| D563,398 S | 3/2008 | Wohlford et al. |
| D563,399 S | 3/2008 | Wohlford et al. |
| D563,416 S | 3/2008 | Bremmon |
| D563,774 S | 3/2008 | Wohlford et al. |
| D563,962 S | 3/2008 | Grey |
| D565,399 S | 4/2008 | Grey |
| D565,632 S | 4/2008 | Rupp |
| D566,444 S | 4/2008 | Grey |
| D568,135 S | 5/2008 | Pribyl et al. |
| D568,144 S | 5/2008 | Wohlford et al. |
| D569,891 S | 5/2008 | Dittmer et al. |
| D570,394 S | 6/2008 | Dittmer et al. |
| D570,894 S | 6/2008 | Dittmer et al. |
| 7,380,760 B2 | 6/2008 | Dittmer |
| 7,387,286 B2 | 6/2008 | Dittmer et al. |
| 7,395,996 B2 | 7/2008 | Dittmer |
| D574,407 S | 8/2008 | Dittmer et al. |
| D574,698 S | 8/2008 | Grey et al. |
| 7,438,269 B2 | 10/2008 | Pfister et al. |
| 7,441,739 B2 * | 10/2008 | Huang ............... 248/292.14 |
| D580,445 S | 11/2008 | Bremmon |
| D581,914 S | 12/2008 | Bures et al. |
| D587,036 S | 2/2009 | Russell et al. |
| D587,504 S | 3/2009 | Russell et al. |
| D589,075 S | 3/2009 | Rupp |
| 7,497,412 B2 | 3/2009 | Dittmer et al. |
| 7,503,536 B2 | 3/2009 | Friederich et al. |
| D591,756 S | 5/2009 | Wohlford et al. |
| D595,299 S | 6/2009 | Bures |
| D595,723 S | 7/2009 | Bures et al. |
| D602,923 S | 10/2009 | Skull |
| D605,185 S | 12/2009 | Russell et al. |
| 7,628,367 B2 | 12/2009 | Friederich et al. |
| D613,277 S | 4/2010 | Skull |
| D616,011 S | 5/2010 | Dittmer |
| D620,943 S | 8/2010 | Grey et al. |
| D621,390 S | 8/2010 | Skull et al. |
| D623,679 S | 9/2010 | Dittmer |
| D623,680 S | 9/2010 | Dittmer |
| D624,061 S | 9/2010 | Smith et al. |
| D624,578 S | 9/2010 | Smith |
| 7,793,903 B2 | 9/2010 | Dittmer et al. |
| D625,750 S | 10/2010 | Dittmer |
| D627,787 S | 11/2010 | Grey et al. |
| 7,823,847 B2 | 11/2010 | Bremmon et al. |
| 7,823,849 B2 | 11/2010 | Dittmer et al. |
| 7,866,618 B2 | 1/2011 | Grabania et al. |
| 7,866,622 B2 | 1/2011 | Dittmer |
| D631,875 S | 2/2011 | Skull et al. |
| 7,891,624 B2 | 2/2011 | Dittmer et al. |
| D634,328 S | 3/2011 | Grey et al. |
| D634,606 S | 3/2011 | Dittmer |
| D634,770 S | 3/2011 | Dittmer |
| D635,130 S | 3/2011 | Skull et al. |
| 7,922,139 B2 | 4/2011 | Dittmer et al. |
| D638,023 S | 5/2011 | Skull et al. |
| 7,954,780 B2 | 6/2011 | Dittmer |
| D641,369 S | 7/2011 | Skull et al. |
| 7,975,976 B2 | 7/2011 | Wohlford |
| D642,583 S | 8/2011 | Dittmer et al. |
| D643,421 S | 8/2011 | Russell et al. |
| 7,988,119 B2 | 8/2011 | Dittmer et al. |
| D646,685 S | 10/2011 | Skull et al. |
| 8,072,739 B2 | 12/2011 | Dittmer |
| 8,094,438 B2 | 1/2012 | Dittmer et al. |
| 8,138,469 B2 | 3/2012 | Dittmer |
| D662,103 S | 6/2012 | Brandt |
| D662,104 S | 6/2012 | Brandt |
| D663,736 S | 7/2012 | Stanek et al. |
| D666,207 S | 8/2012 | Brandt |
| 8,235,342 B2 | 8/2012 | Pfister et al. |
| 8,254,092 B2 | 8/2012 | Russell et al. |
| RE43,696 E | 10/2012 | Graham |
| 8,297,578 B2 | 10/2012 | Dittmer et al. |
| D672,782 S | 12/2012 | Gross |
| D676,451 S | 2/2013 | Stanek et al. |
| 8,456,808 B2 * | 6/2013 | Grey et al. ............... 361/679.01 |
| 8,490,934 B2 | 7/2013 | Dittmer |
| 8,508,918 B2 | 8/2013 | Dittmer et al. |
| 8,519,326 B2 | 8/2013 | Dittmer |
| 8,542,499 B2 | 9/2013 | Skull |
| 8,693,172 B2 | 4/2014 | Russell et al. |
| 8,720,846 B2 | 5/2014 | Wohlford et al. |
| 8,837,127 B2 | 9/2014 | Dittmer et al. |
| 8,891,249 B2 | 11/2014 | Stanek et al. |
| 2002/0066199 A1 * | 6/2002 | Hanson ............... 33/613 |
| 2005/0110911 A1 | 5/2005 | Childrey et al. |
| 2007/0030405 A1 | 2/2007 | Childrey et al. |
| 2007/0153459 A1 | 7/2007 | Wohlford et al. |
| 2009/0084913 A1 | 4/2009 | Grabania et al. |
| 2010/0193455 A1 | 8/2010 | Russell et al. |
| 2010/0214729 A1 | 8/2010 | Dittmer et al. |
| 2010/0284306 A1 | 11/2010 | Morimoto |
| 2011/0043978 A1 | 2/2011 | Bremmon et al. |
| 2011/0234926 A1 | 9/2011 | Smith |
| 2011/0296667 A1 | 12/2011 | Dittmer et al. |
| 2012/0261362 A1 | 10/2012 | Skull et al. |
| 2013/0187019 A1 | 7/2013 | Dittmer et al. |
| 2013/0314890 A1 | 11/2013 | Smith |
| 2014/0263108 A1 | 9/2014 | Grey et al. |

OTHER PUBLICATIONS

Chief, Professional AV Solutions. RXT2 Large FIT™ Tilt Wall Mount http://www.chiefmfg.com/Series/RLT; date of download Oct. 20, 2014.

* cited by examiner

FLEXIBLE MOUNT APPARATUS AND SYSTEM

RELATED APPLICATIONS

The present application claims priority to U.S. Provisional Application Ser. No. 61/709,130, filed Oct. 2, 2012, the disclosure of which is incorporated by reference.

BACKGROUND

1. Field of the Invention

The present invention generally concerns a mounting frame system. More particularly, the present invention relates to a horizontally collapsible mounting frame system and apparatus.

2. Description of the Related Art

Traditionally, mounting frames have a wall plate consisting of two horizontal rails with vertical supports. The user must assemble the frame by attaching the horizontal rails to the vertical supports, with, for example, screws, to form an H-shaped frame. This type of design that requires assembly of the frame can be complicated, frustrating, and time-consuming for the user.

Designs that have a simple, single horizontal wall plate, typically utilizing only three rails, may also be less stable. However, the disassembled rails can be shipped efficiently and cheaply, as the parts can be combined into a small box.

An improved design uses only one wall plate that consists of two vertical rails affixed to two horizontal rails to form a rectangular frame. The frame is hinged at the mid-point of each of the two horizontal rails, which allows the frame to fold lengthwise. This fold-over frame design utilizes a solid rectangular frame, with four rails as opposed to three rails, and therefore offers more stability for mounting appliances to walls.

Designs that are pre-assembled (e.g., a fold-over design) are less complicated for users because they do not require assembly and they offer more stability. However, the pre-assembled design is more difficult and expensive to ship due to its size, which is typically larger than the traditional disassembled mounting frame design.

There is a need for a mounting frame apparatus and mounting system that is stable, user-friendly, and compact.

SUMMARY OF THE CLAIMED INVENTION

A flexible mounting system for mounting an object on a wall is disclosed. The system includes a frame that collapses horizontally, like an accordion, and at least one vertical mounting rail on which the user can mount an object. The frame is made up of two horizontal rails and two side rails. The side rails are hinged to the two horizontal rails to form a rectangular frame. Each of the side rails is hinged at its midpoint to allow the side rails to flex inward toward the center of the frame when the frame is collapsed.

A flexible mount apparatus for mounting an object on a wall is disclosed. The apparatus is made up of a top and bottom horizontal rail. The top rail is hinged at each end to two side rails. The bottom rail is hinged at each end to two side rails. The upper and lower side rails meet in the middle at a connector piece, which is hinged at one end to the upper side rail and at the other to the lower side rail. The side rails and horizontal rails form a rectangular frame that allows the side rails to flex inward toward the center of the frame when the frame is collapsed.

DETAILED DESCRIPTION

Embodiments of the present invention provide a flexible mount apparatus for mounting an object, such as a flat-screen television, to a vertical surface. Persons of ordinary skill in the art will realize that the following description of the present invention is illustrative only and not in any way limiting. Other embodiments of the invention will readily suggest themselves to such skilled persons.

Figure 1A:
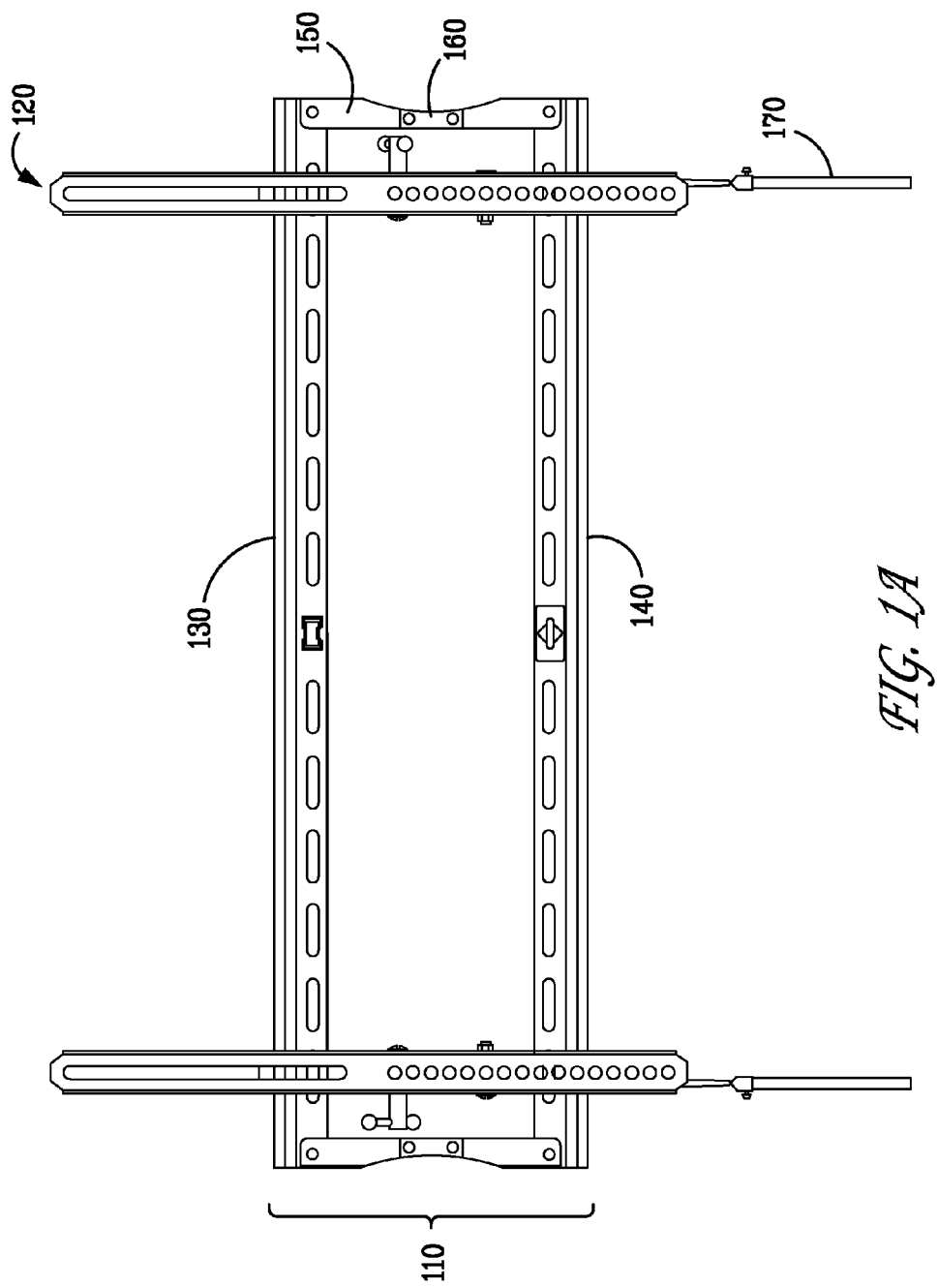
FIG. 1A illustrates a flexible mounting system.

Referring now to FIG. 1A, illustrating an exemplary embodiment of a flexible mounting system, a flexible mount frame 110 is coupled to vertical mounting rails, one of which is labeled 120. The flexible mount frame is collapsible horizontally, rather than in fold-over fashion, such that the top horizontal rail 130, bottom horizontal rail 140, and side rails, one of which is labeled 150, are parallel and adjacent to one another when the frame is collapsed. Each of the side rails 150 is pivotally mounted to top horizontal rail 130 and bottom horizontal rail 140. Each of the side rails is hinged at its midpoint by a connector, one of which is labeled 160, that remains vertical even when the side rails 150 are collapsed horizontally.

In one embodiment of the present invention, locking straps, one of which is labeled 170, containing a spring locking mechanism are attached to vertical side rails 120. Once an object has been attached to vertical side rails 120, a user may pull downward on the locking straps 170 to lock the vertical side rails 120 into place on the flexible mount frame 110.

In one embodiment of the present invention, vertical side rails 120 contain a small aperture 175 through which a padlock may be placed to lock the object to the mounting system. The addition of a padlock can help prevent theft of the mounted object.

Figure 1B:
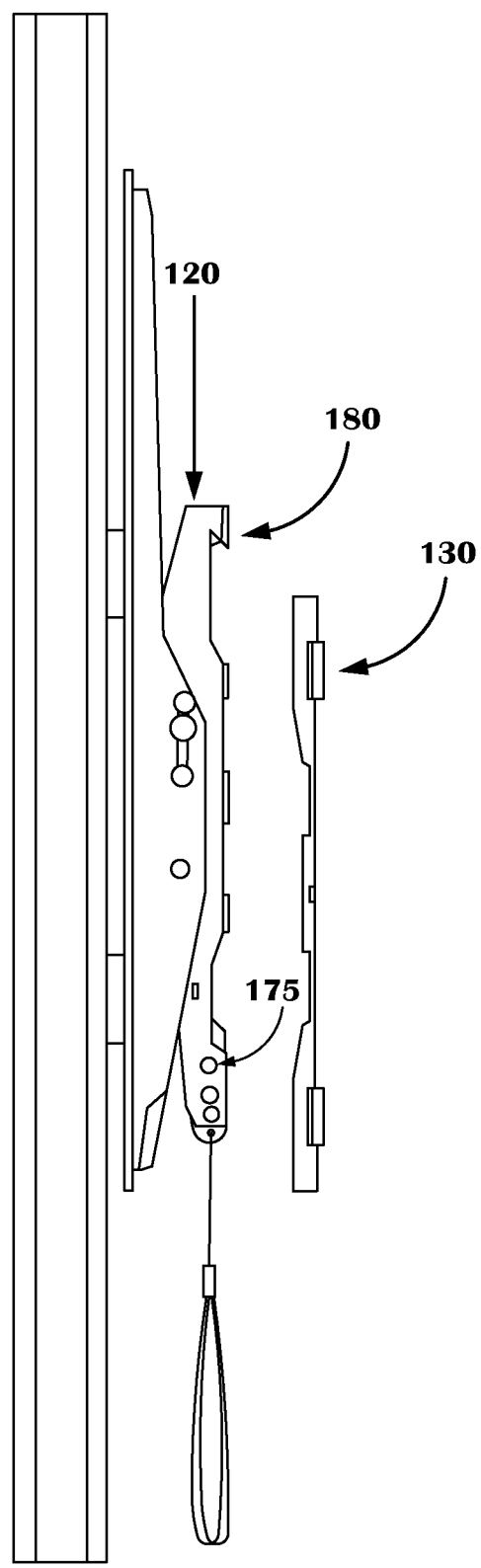
FIG. 1B illustrates a side view of a flexible mounting system.

Referring now to FIG. 1B, illustrating a side-view of an exemplary embodiment of a flexible mounting system, vertical mounting frame 120 has a lip 180. The vertical mounting rail 120 can be attached to the flexible mount frame 110 by hanging the lip 180 on the top horizontal rail 130.

Figure 2A:
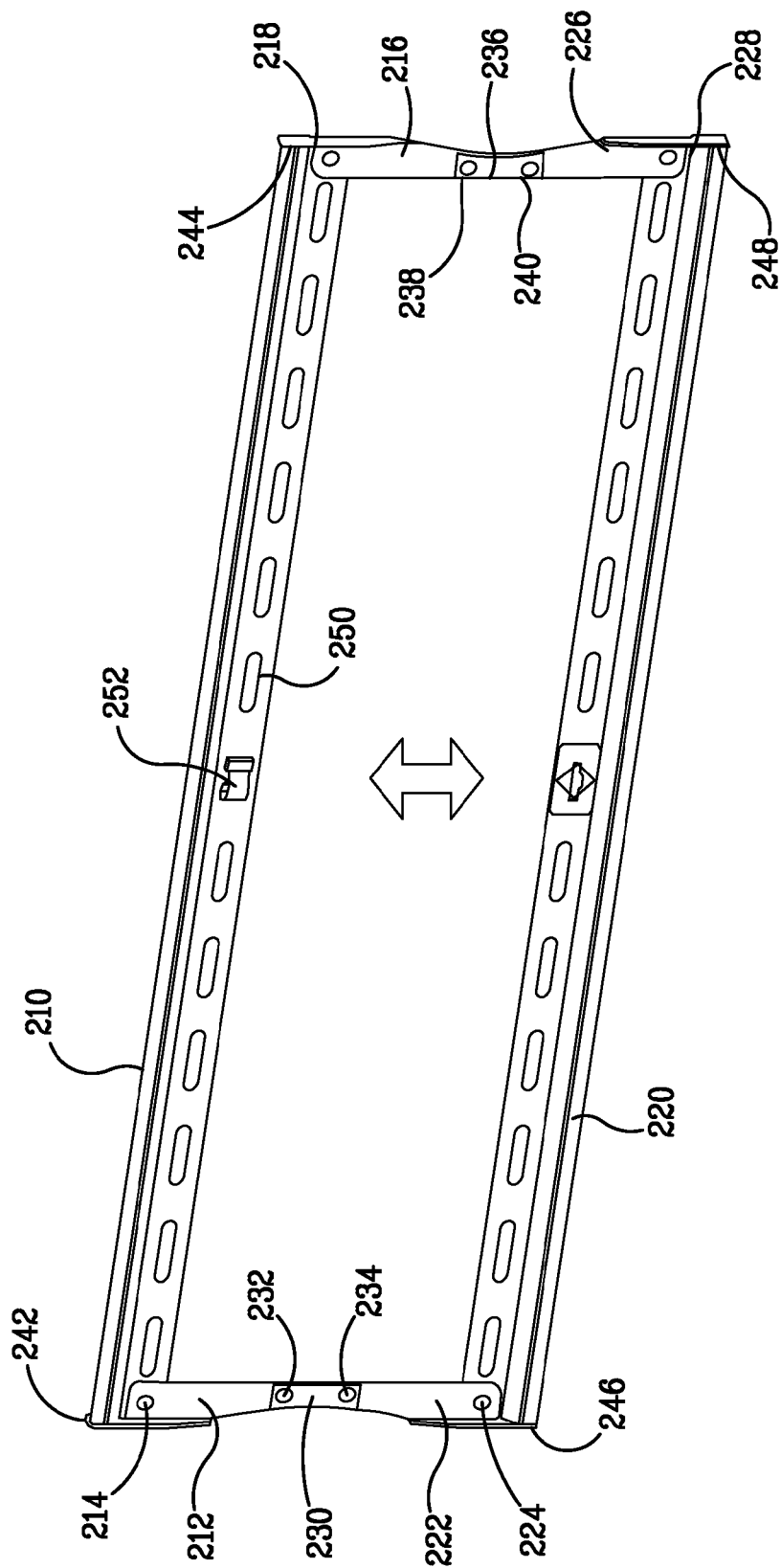
FIG. 2A illustrates an expanded flexible mount frame.

Referring now to FIG. 2A, illustrating an expanded flexible mount frame, a top horizontal rail 210 is coupled to a first upper side rail 212 on a first end by a first rail hinge 214. Top horizontal rail 210 is coupled to a second upper side rail 216 on a second end by a second rail hinge 218. A bottom horizontal rail 220 is coupled to a first lower side rail 222 on a first end by a third rail hinge 224. Bottom horizontal rail 220 is further coupled to a second lower side rail 226 on a second end by a fourth rail hinge 228.

First upper side rail 212 is coupled to a first stationary connector 230 at a first end by a first connector hinge 232. First stationary connector 230 is coupled at a second end to the first lower side rail 222 by a second connector hinge 234. Second upper side rail 216 is coupled to a second stationary connector 236 at a first end by a third connector hinge 238. Second stationary connector 236 is coupled at a second end by a fourth connector hinge 240 to the second lower side rail 226.

The outer edge of first upper side rail 212 is coupled to a first parallel appendage 242 extending toward the first end of top horizontal rail 210. The outer edge of second upper side rail 216 is coupled to a second parallel appendage 244 extending toward the second end of top horizontal rail 210. The outer edge of first lower side rail 222 is coupled to a third parallel appendage 246 extending toward a first end of bottom horizontal rail 220. The outer edge of second lower side rail 126 is coupled to a fourth parallel appendage 248 extending toward a second end of bottom horizontal rail 220.

In an exemplary embodiment, grooves, one of which is labeled 250, are placed axially along top horizontal rail 210 and along bottom horizontal rail 220 through which hardware, such as screws, can be placed to secure the frame to a vertical surface.

In an exemplary embodiment, a spirit level 252 may be integrated with top horizontal rail 210 or bottom horizontal rail 220 to assist the user with level attachment of the frame to the vertical surface.

Figure 2B:
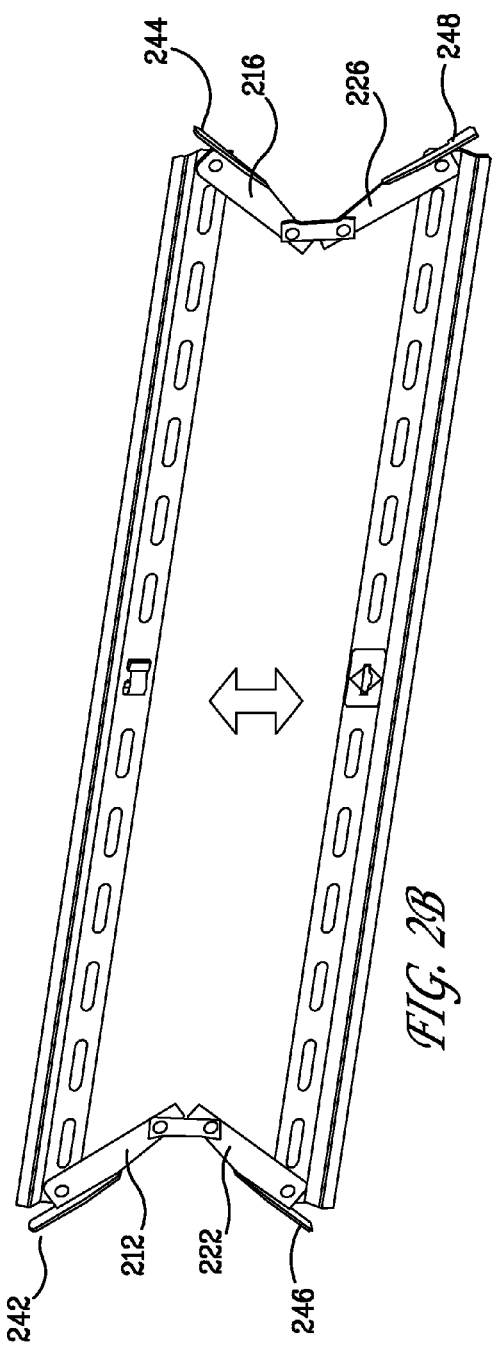
FIG. 2B illustrates a partially collapsed flexible mount frame

Referring now to FIG. 2B, illustrating a view of a partially collapsed flexible mount frame, downward pressure may be applied to first vertical appendage 242 and second vertical appendage 244, while upward pressure is applied to third vertical appendage 246 and fourth vertical appendage 248. First upper side rail 212 and second upper side rail 216 rotate, such that their lower ends move toward the center of the frame. First lower side rail 222 and second lower side rail 226 will also rotate, such that their upper ends move toward the center of the frame. Applying pressure to the extended appendages, rather than the frame itself, will allow the frame to safely collapse without requiring users to place their hands or fingers inside or on the rails, preventing potential injury as the frame collapses.

Figure 2C:
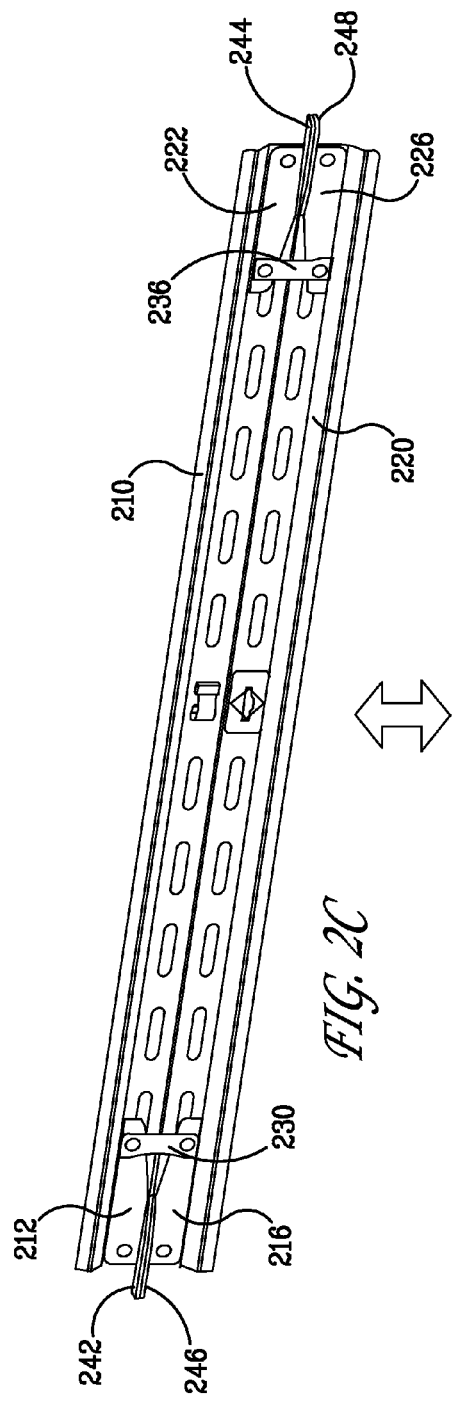
FIG. 2C illustrates a fully collapsed flexible mount frame.

Referring now to FIG. 2C, illustrating a fully collapsed flexible mount frame, first upper side rail 212, second upper side rail 216, first lower side rail 222, and second lower side rail 226 are parallel to top horizontal rail 210 and bottom horizontal rail 220, while first stationary connector 230 and second stationary connector 236 remain vertical. It will be understood that upward pressure may be applied to first appendage 242 and second appendage 244 while downward pressure is applied to third appendage 246 and fourth appendage 248 to expand the frame to a rectangular shape.

The collapsed frame of FIG. 2C allows for efficient shipping because of its compact design. Smaller boxes can be used to ship the frame, which may save shipping costs and allow for faster transport. The frame of the present invention is also user-friendly because the frame is pre-assembled. Users do not have to use hardware to connect the side rails to the horizontal rails. The frame of the present invention provides security due to its rectangular shape and use of four rails, as opposed to the traditional three-railed H-frame design for similar mounts.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A flat-screen television mounting system, the system comprising:
    a horizontally collapsible frame that couples to a wall, wherein the frame includes:
        two horizontal rails, each horizontal rail having a first end and a second end,
        a first side rail pivotally mounted between the respective first ends of the two horizontal rails, wherein the first side rail is hinged at a midpoint by a first stationary connector, and
        a second side rail pivotally mounted between the respective second ends of the two horizontal rails, wherein the second side rail is hinged at a midpoint by a second stationary connector; and
    one or more vertical mounting rails that couple to and support a flat-screen television, the one or more vertical mounting rails coupled to the horizontally collapsible frame.

2. The system of claim 1, further comprising one or more locking straps coupled to the one or more vertical mounting rails.

3. The system of claim 2, wherein the one or more vertical mounting rails includes an aperture through which the one or more vertical mounting rails couple to a portable lock.

4. The system of claim 1, wherein one of the two horizontal rails includes an integrated spirit level.

5. The system of claim 1, wherein:
    the first side rail is coupled to two appendages that are parallel to the first side rail and extend beyond the first side rail at either end; and
    the second side rail is coupled to two appendages that are parallel to the second side rail and extend beyond the second side rail at either end.

6. The system of claim 1, wherein the two horizontal rails have a plurality of axial grooves.

7. A flat-screen television mount apparatus, the apparatus comprising:
    a top horizontal rail that couples to a wall, the top horizontal rail pivotally coupled to a first side rail and a second side rail;
    a first connector pivotally coupled to the first side rail;
    a third side rail pivotally coupled to the first connector;
    a bottom horizontal rail that couples to a wall, the bottom horizontal rail pivotally mounted to the third side rail;
    a fourth side rail pivotally coupled to the bottom horizontal rail; and
    a second connector pivotally coupled to the fourth vertical side rail and the second vertical side rail, wherein the flat-screen television mount apparatus is adjustable between a collapsed configuration and an expanded configuration while remaining assembled.

8. The apparatus of claim 7, wherein the top horizontal rail includes an integrated spirit level.

9. The apparatus of claim 7, wherein:
    the first side rail is coupled to an appendage that is parallel to the first side rail and extends toward the top horizontal rail;
    the second side rail is coupled to an appendage that is parallel to the second side rail and extends toward the top horizontal rail;
    the third side rail is coupled to an appendage that is parallel to the third side rail and extends toward the bottom horizontal rail; and
    the fourth side rail is coupled to an appendage that is parallel to the fourth side rail and extends toward the bottom horizontal rail.

10. The apparatus of claim 7, wherein the top horizontal rail includes a plurality of axial grooves.

11. The apparatus of claim 7, wherein the bottom horizontal rail includes a plurality of axial grooves.

* * * * *